United States Patent [19]

Reich

[11] Patent Number: 5,342,862
[45] Date of Patent: Aug. 30, 1994

[54] PROCESS FOR CONTROLLING THE PHOTODEGRADATION OF MULCH FILM

[75] Inventor: Murray H. Reich, Princeton, N.J.

[73] Assignee: Biolan Corporation, Princeton, N.J.

[21] Appl. No.: 166,358

[22] Filed: Dec. 13, 1993

Related U.S. Application Data

[63] Continuation-in-part of Ser. No. 86,519, Jul. 1, 1993, which is a continuation of Ser. No. 630,558, Dec. 20, 1990, abandoned, which is a continuation-in-part of Ser. No. 492,955, Mar. 13, 1990, abandoned.

[51] Int. Cl.$^5$ .................. C08K 3/04; C08K 5/34.35; C08L 23/12
[52] U.S. Cl. .................. 523/125; 523/124; 264/211; 524/495; 524/496; 524/94; 524/96; 524/528; 524/534
[58] Field of Search .............. 47/9 S; 264/176.1, 211; 523/124, 125; 524/96, 99, 495, 496, 528, 534; 525/240, 232

[56] References Cited

U.S. PATENT DOCUMENTS

| | | | |
|---|---|---|---|
| 3,422,056 | 1/1969 | Carton | 524/496 |
| 3,426,105 | 2/1969 | Christensen | 525/232 |
| 3,503,922 | 3/1970 | Carton | 524/496 |
| 3,562,790 | 2/1971 | Coover | 525/232 |
| 3,634,553 | 1/1972 | Foglia et al. | 525/240 |
| 3,896,585 | 7/1975 | Miller et al. | 525/496 |
| 4,042,765 | 8/1977 | Floyd et al. | 523/125 |
| 4,113,806 | 7/1978 | Watson et al. | 525/232 |
| 4,118,350 | 2/1980 | Vicik et al. | 525/235 |
| 4,210,579 | 7/1980 | Gripo et al. | 525/232 |
| 4,336,351 | 7/1982 | Cinader | 525/240 |
| 4,354,004 | 10/1982 | Hughes et al. | 525/240 |
| 4,617,365 | 10/1986 | Donishi et al. | 524/548 |
| 4,734,459 | 3/1988 | Cecchin et al. | 525/240 |
| 4,761,451 | 8/1988 | Moteki et al. | 524/496 |
| 4,778,866 | 10/1988 | Shimoda et al. | 526/245 |
| 4,812,526 | 3/1989 | Rifi | 525/240 |
| 4,826,729 | 5/1989 | Kitamura | 524/413 |
| 5,166,268 | 11/1992 | Ficker | 525/240 |

FOREIGN PATENT DOCUMENTS

| | | | |
|---|---|---|---|
| 0152736 | 11/1980 | Japan | 524/528 |
| 0204646 | 11/1981 | Japan | 525/232 |
| 0176217 | 10/1983 | Japan | 524/496 |
| 0120775 | 6/1985 | Japan | 525/240 |
| 0243149 | 10/1988 | Japan | 524/496 |
| 0251549 | 10/1990 | Japan | 525/240 |
| 2132621 | 7/1984 | United Kingdom | 523/125 |

*Primary Examiner*—Peter Szekely
*Attorney, Agent, or Firm*—R. Gale Rhodes, Jr.

[57] ABSTRACT

Process for controlling the photodegradation of a film of polypropylene or propylene copolymers having a thickness of about 1.25 mils or less, by forming a composition comprising carbon black as the sole UV light absorbing staiblizer and comprising about 0.5% to about 2.4% by weight of the film, hindered amine light stabilizer for interrupting the free radical chain degradation mechanism and comprising about 0.02% to about 0.4% by weight of the film; and an impact modifier for enhancing the photodegradability of the film and comprising about 1% to 40% by weight of the film.

18 Claims, No Drawings

PROCESS FOR CONTROLLING THE PHOTODEGRADATION OF MULCH FILM

CROSS-REFERENCE TO RELATED APPLICATION

This application is a continuation-in-part of patent application Ser. No. 08/086,519 filed Jul. 1, 1993, which application is a continuation of patent application Ser. No. 07/630,558 filed Dec. 20, 1990, now abandoned, which application is a continuation-in-part of patent application Ser. No. 07/492,955 filed Mar. 13, 1990, now abandoned, all applications entitled THIN DEGRADABLE FILMS, Murray H. Reich inventor of all applications, and all applications assigned to the same assignee as this application.

The present invention relates generally to photodegradable films and more particularly relates to a process of controlling the photodegradation of a film of polypropylene, or propylene copolymers, having a thickness of about 1.25 mils or less and which film is particularly useful as a photodegradable agricultural mulch film. A large proportion of the plastic films which is presently manufactured is intended to be used indoors, or for relatively limited periods of outdoor exposure, after which it is usually discarded or otherwise disposed of in landfills, recycled, or incinerated. Examples of such plastic films which are used indoors would include packaging films for food, liners for disposable diapers, disposable clothing, cosmetic and pharmaceutical films, films for detergents and other cleaning agents, and many others. Examples of plastic films which are exposed to the outdoors for limited periods of time include garbage bags, films used for construction purposes such as temporary windows and for curing concrete, agricultural mulch films, films to contain fumigants, and many other uses.

Plastic use has grown phenomenally, and this growth will undoubtedly continue unabated. In addition, about 30% of the total use of such plastics is used in different types of packaging and film applications. An unhappy side effect of the explosive growth of plastics usage is to aggravate the problem of disposing of solid waste materials in general and the accumulation of solid wastes over recent years which have resulted in severe environmental problems.

A costly aspect of solid wastes disposal is collection and transportation to the disposal areas. Wastes are collected on a regular basis in plastic bags, cans, containers, and are picked up as litter on streets, highway, rivers, parks, etc. It is more costly to collect litter than solid waste in a container.

Another expensive aspect of solid waste removal is disposing of the refuse and wastes after they are collected. According to the Federal Bureau of Solid Waste Management, the disposal costs run several times the cost of collection.

The usual method of solid waste disposal is by landfill, which accommodates over 90% of the country's solid waste at about 12,000 landfill sites. The Bureau of Solid Waste Management states that this seemingly simple disposal method presents formidable problems, such as the evolution of noxious gases from some wastes, the leaching of some wastes by ground waters, and continued settling of the film if it is not properly compacted, and the long life of plastics.

Another serious restriction to the use of landfill as a disposal method is the aversion of the public to the use of land to dispose of waste in their own communities.

Another major method of solid waste disposal is incineration. There have been several recent developments in incineration technology including a rotary kiln incinerator which requires that the wastes be classified into those that can be fed to the kiln directly (trash and scrap plastic), pumpable wastes, and miscellaneous liquid wastes. However, it was necessary to develop separate feed systems for each category.

Another more serious problem facing state and municipal governments using incinerators is the increased stringency of air pollution control regulations which restrict the amount and the type of air pollutants the incinerator can exhaust to the atmosphere, and require that the incinerator be maintained at high burning efficiency.

Plastics also find many uses in agriculture and a recent report on the use of plastics as mulch film shows that this use has grown to over 125 million pounds in 1987. The films are used as mulch to change the environment of the growing plants and to protect the growing plants from low rainfall, and to modify soil temperatures. They are used to reduce the amount of fertilizer, to control weeds and thereby reduce and/or eliminate the use of herbicides, to contain the fumigant, to hasten the growth of plants, termed early maturity, so that growers may command a higher prices for their products, to prevent evaporation of water and leaching of materials, reducing the amount of water and fertilizers used to grow crops, and to develop more extensive root systems. Mulch films are used as row covers to produce tunnels under which the plants are protected, as in a greenhouse.

Low soil temperatures during the spring may reduce plant growth and prolong the growing season. Mulch films can provide higher soil temperature and cause early plant development. Soil temperatures are increased significantly (over 10° F.) by the use of mulch films.

However, costs at landfills have increased in recent years to as much as $100/ton and presently about 25% of American cities have closed their landfills. Furthermore, municipalities are passing laws restricting the use of plastics for certain films and some states are requiring the use of biodegradable bags for trash. These disadvantages serve to restrict the use of plastics for trash bags and in agriculture. An opposing force comes from environmental activists who want to restrict the use of chemicals by growers and this tends to increase the use of black plastic by growers. Organic growers are likely to use a black film so as not to use herbicides, but also want the film to photodegrade in the field. In addition, organic growers do not want degradable films which contain organic compounds of heavy metals such as nickel and cobalt. Some states are concerned that these metals may ultimately build up in the soil and ground waters.

In a typical application, fields are covered with a plastic film prior to the start of the growing season, using a film applicator which applies about 2- to 6-foot wide and generally 4- and 5-foot wide strips of film on the ground, leaving narrow rows of exposed soil between the strips of film. The same day or after a few days to a few weeks, or after fumigation, holes are punched in the plastic film and young plants or seeds of snap beans, watermelons, cucumbers, peppers, summer squash, eggplant, muskmelons, tomatoes, cantaloupes, pumpkins, lettuce, strawberries, and the like are planted through the holes in the plastic. The mulch film raises the soil temperature in the root zone, decreases moisture evaporation and eliminates hoeing which can injure the root system of the plants. Another advantageous effect of mulch film is that higher levels of carbon dioxide are produced under the film, which escapes through holes punched in the film to feed growing leaves of the plant. The mulch film generally increases markedly the number of vegetables produced, especially those produced early in the growing season, and the average weight of the vegetables.

Mulch films also provide improved soil structure by preventing soil compaction and soil crusting. The soil remains loose and friable and provides good aeration for the roots of the plants. In good soil structure, an extensive root system can develop, especially in soil close to the plant, where unmulched soil dries, crusts and root growth is limited. Mulch film contributes to a healthy root system.

Accordingly, mulch films are used to conserve soil moisture, prevent premature leaching of fertilizer, raise soil temperature, fumigate the soil, improve soil structure, increase beneficial microbial activity in the soil, decrease fruit rot, and aid in root development. Mulch films increase crop yields and size of individual crops, prevent weed growth, cause early maturity of the plant, and minimize the hazards of parasites and weather, such as drought, rainfall, and cool weather.

The serious limitation of available commercial mulch films is that mulch films do not decompose during the growing season and must be removed at the end of the crop season. If the film is not removed, the film becomes entangled in the tillage equipment, interfering with seeding.

Antipollution laws in some places have restricted the disposal of these mulch films to specific locations, thus requiring transportation of used mulch films to these areas.

Accordingly, disposal of presently available mulch films at the end of the growing season is costly, time consuming and contributes to the problem of solid wastes disposal.

Because of the important functions of mulch films, it is essential that mulch films should not disintegrate prematurely, otherwise they would no longer remain useful in conserving soil moisture, raising soil temperature, controlling weed growth, and maintaining good soil structure. Neither should the films degrade so slowly that they will interfere with plowing the field after harvest, delay soil treatment and preparation for planting of subsequent crops. Therefore, it is important to control the breakdown within relatively narrow periods, for example, 40-180 days, 80-180 days, and 50-110 days of direct sunlight. Thus in transplanting cantaloupes in Vermont, in which a 40-70 day film is used, the film must remain intact for at least 35 to 45 days, and must not degrade in 30 days. Yet, after about 70 days of exposure to direct sunlight, the film must be brittle enough to allow plowing in the field. A film with a life of 120 days would still be quite flexible after the harvest season.

In addition, the residues of degraded mulch films should not contain heavy metals, such as nickel and cobalt compounds, which might contaminate the soil and possibly end up in the ground water system.

Existing degradable agricultural mulches, as described in U.S. Pat. Nos. 3,984,940, 3,896,585, and 3,886,683 meet some needs of the farmer but have several limitations. Those based on polybutene have limitations of the high price of the base resin, and consequent limited production, making it unavailable for many farmers, and also limitations in usage, due to the difficulty in making the films sufficiently thin to make them attractive in price to the farmer. At present, farmers spend about $50 to $100 to remove the film and about $50 to dispose of the film, although some farmers leave the film on their land, letting it pile up. A few states still permit the growers to burn the film.

Those based on polypropylene, as described in U.S. Pat. No. 3,984,940, though useful in warm climates, have the limitation that they cannot be placed down in the early stages of cultivation because they have poor stress-strain properties at low temperatures, becoming very brittle and are easily ripped by sharp weeds or by animals. Polypropylene is noted for its poor flexibility at low temperatures, as low as 20° F. experienced during February in northern Florida, and in March in Delaware and southern New Jersey.

This is a decided disadvantage in mulch films, because the film can be torn during the placement of the film, and/or during the transplanting operation when rubber wheels move along the length of the film, or the less flexible film can be torn when farm hands walk on the film to drop seeds or transplants into the holes, especially during cool March days in Delaware and New Jersey and cool days in February in northern Florida.

In standard polypropylene films, these tears can grow the length of the film, exposing the baby plant to cold weather, water loss, and the growth of weeds, which suck the needed nutrients from the young plants. Also, strong March winds can further split the film, causing large pieces to be blown away during the early stages of plant growth. To prevent loss of film, the farmer has to constantly check his field and throw dirt on the split film to protect it from further breaks, causing undue expenses and preventing the normal breakdown of the film.

Another disadvantage of the prior art is that it does not distinguish among different classes of light stabilizers, one type of which contains the heavy metal nickel. In addition, the prior art teaches that processing conditions must be made more severe so as to decrease the outdoor stability by a minimum of 5000 TALU, which adjustment may decrease the molecular weight sufficiently to harm physicals. Table II of U.S. Pat. No. 3,984,940 shows that 5000 TALU is equivalent to about 14 days of outdoor stability in the spring and summer.

Another disadvantage of degradable films, as presently taught by the prior art, is the need for relatively large amounts of expensive stabilizers, such as substituted benzotriazoles, to control the breakdown of the thin films. These types of UV stabilizers are not effective in controlling the degradation of mulch films within the relatively narrow time constraints of modern commercial mulch films.

It is well know that for certain crops, such as transplanted watermelons, the film should last about 40 to 50 days, from about mid-May to about late June in Indiana and Pennsylvania, until the runners cover the film and delay further degradation. When the vines wither after harvest, the film receives more direct sunlight, and degradation continues until embrittlement. For seeded watermelons in South Carolina, the vines do not cover the film for about 60 days, so that a film that becomes brittle in about 60 to 100 days of sunlight is needed. The film is applied in mid February and runners cover the film in about mid-April. Watermelons are picked through June, after which the film is exposed to additional sunlight. Thus, although the film lasts for a total of about four months or 120 days, it is exposed to direct sunlight for only 60 days or so during planting and harvesting. Other crops and areas may require a different set of outdoor breakdown characteristics. The prior art did not teach how to control and regulated the breakdown of the mulch film within these narrow time limits.

Although small amounts of UV absorbing type stabilizers may be effective in controlling the breakdown of 2-mil films, which is thicker than most normal mulch films which are about 1.25 to 1.5 mils, such methods of control are less efficient for thin films, 1.25 mil or less. For these films, different methods of breakdown control are needed. To further explain this phenomenon, examine a film of 0.85 mil compared to previous films having a thickness of 2 mils. Assume that the same amount of UV stabilizer, 0.3% of Tinuvin 327, a benzotriazole type stabilizer, was used. When the film is 2 mils thick a cross section of the film may have stabilizer at the surface or at one or two levels below the surface. When UV radiation contacts the film, it may be absorbed at the top level or by film below the surface. Thickness provides a safety unit to absorb UV radiation.

But with a thin film, the stabilizer must absorb the UV radiation at the surface in order to control the rate of degradation, but since it cannot be at every point on the surface, more stabilizer is needed. For example, if the thickness of the film was reduced from 2 to 1 mil, a reduction of 50% the stabilizer might theoretically have to be increased by a minimum of 50% to obtain the same level of stability. Thus, the drop in cost gained by reducing the thickness would be lost by a marked increase in the cost of an expensive UV absorbing type light stabilizer which screens the radiation. It is very difficult to control the breakdown of thin films by using an absorbing type of light stabilizer. Also, the prior art did not show the importance of having degradable films that comply with FDA regulations.

In practice our tests have shown that the previously cited light stabilizer, benzotriazole type, was ineffective in regulating the breakdown of thin films. In fact in one field trial, the unstabilized film had a longer or the same life as did the films stabilized with normal amounts of the absorbing type stabilizer. This is not to say that thin films of polypropylene cannot be stabilized by using large amounts of absorbing types of stabilizer, but the prior art does not show how and whether this can be accomplished. And the prior art does not show how the outdoor breakdown can be controlled within certain limits, within a window of degradation, in order to produce a mulch film with real commercial value.

For a cover for tomatoes grown in the northeast, the film must hold up for about eight weeks during the period that the plants are taking root and the crop is starting to grow. The film should begin to become brittle during hot summer months especially useful for those farmers who use overhead irrigation. Then, the film should become quite brittle during August, and sometime after in October or November, the field should be readily disced.

And finally, a disposable garbage bag might require outdoor stability of a month, in order to be sure that the garbage does not spill out on the streets, but, degradation should be initiated outside and should continue in the landfill and compost unit, so that the bag will become brittle and the contents become available for further degradation.

The present invention teaches thin films with practical, inexpensive, and controlled degradability which have practical and commercial application, which can compete in the market place with nondegradable polyethylene and has demonstrable advantages over other types of degradable films.

For example, in commercial polyethylene films degradation is controlled by small amounts of oxidants, and/or oxidants and stabilizers. The thickness is 1.25 and 1.5 mils. Thick films require the grower to spend more time applying the film, because there are fewer square feet per pound and therefore are more expensive than thinner films.

It is an object of the present invention to provide a process for controlling the photodegradation of thin plastic films, including agricultural mulch films, disposable trash bags, and liners for disposable diapers which can be disposed of merely by outdoor exposure to sunlight so they do not require incineration, burial, or dumping for disposal, and which do not leave heavy metals as contaminants.

A further object of the present invention is to provide a process of controlling the photodegradation of commercial films which will cause such films to degrade within a predictable period of exposure to solar radiation in a known climate, whereby the film degrades completely and is consumed by the natural elements. For example, agricultural mulch films can be prepared according to the present invention, such that the films will degrade completely after the growing season in a known climate. The rate of degradation will be regulated, depending upon the crop, specific methods of planting, such as seeds, transplants, type of soil preparation. The breakdown of the film is matched to the specific needs of a particular crop and method of planting.

It has now been surprisingly discovered that thin degradable plastic films with the useful properties and characteristics such as described above can be prepared and their photodegradation controlled without the disadvantages of the prior art. These disadvantages include using ultraviolet stabilizers of the type which absorb UV radiation or the type that serve as quenchers, reducing the stability of the polymer by a minimum of 5000 TALU (Temperature Adjusted Langley unit-a unit of solar radiation equivalent to one gram caloric per square centimeter of irradiated surface) units by subjecting the material to a thermal history which may hurt its physical properties by reducing the molecular weight of the base resin, using stabilizers which contain heavy metal salts, such as nickel and cobalt, which may harm the environment and enter the ground water system, and using oxidants and degradants, whose concentration is difficult to control in thin degradable films.

It has been found that commercially useful thin degradable films can be made that meet FDA regulations for use in polyolefins and have outdoor breakdown characteristics (OBC) that can be controlled and regulated within narrow limits, by reducing to a minimum the film's thermal history to under 5000 TALU units, using precise and definite combinations of resins with inherent breakdown qualities, elastomers in specific quantities to lower outdoor stability, enhance low temperature elongation values and the balance of stress-strain properties at room temperature by reducing the ratio of tensile strength in the machine direction to that in the transverse direction, carbon black of specific particle size and dispersed to a specific degree into a resin, specific amounts of effective ultraviolet stabilizers, and/or matching the particle size of the carbon black and the amount of hindered amine light stabilizers (HALS) with the desired breakdown properties of the degradable film, and using materials and amounts that are FDA cleared for use in polyolefins.

Thermal History

As has been taught by the prior art, the thermal history of the film will influence the OBC of the film. The prior art listed as important in the thermal history such factors as processing temperatures, extrusion speed, and the number of times the resin has been extruded. The prior art did not define the relationship. It is well known that such variables affect the molecular weight of the polyolefins, that is, greater severity in processing reduces the melt index of the resin, but there is little knowledge as to how specifically it affects the OBC of thin degradable polypropylene mulch films. In addition, the prior art taught that most polypropylene films will not be suited for degradable films because their stability will be greater than desired since polypropylene is inherently more unstable than polyethylene and requires heavy doses of both antioxidants and light stabilizers to form useful degradable films of 1 to 2 mils.

Due to the inherent instability of polypropylene during processing, the polypropylene film would normally be compounded with sufficient antioxidant to prevent marked degradation during processing, but would require large amounts of ultraviolet stabilizer in order that the film be useful for outdoor applications. Thus, such prior art polypropylene was loaded with excess melt and light stabilizers to handle both process and outdoor degradation.

The prior art, U.S. Pat. Nos. 3,896,585 and 3,984,940, did not distinguish between the functions of antioxidants and light stabilizers, but lumped both under the rubric of stabilizers. They stated that it is necessary to add 0.005 to 20% of a stabilizer, preferably 0.01 to 5%, and that the stabilizer smooths and renders predictable the OBC of the film.

It is true that antioxidants are known as weak and ineffective light stabilizers and that they are not useful in extending the outdoor stability of thin polypropylene films for significant periods. In fact, the prior art does not teach controlling the degradation during processing since it teaches that it is necessary to reduce the initial stability of the plastic film by a specific thermal history by a minimum of 5000 TALU units, a measure of outdoor stability, and then to add at least 0.01% of stabilizer, in order to control the outdoor stability of the film.

According to U.S. Pat. No. 3,984,940, increasing the extruder speed caused the outdoor stability to decrease by 5000 TALU or more, which translates into a decrease of stability of about 14 days. See Table I column 16 of U.S. Pat. No. 3,984,980.

Also, the prior art does not teach how thermal history can reduce consistently and predictably the outdoor stability by 5000 TALU and not 10,000 or 2000 TALU units. Example one in U.S. Pat. No. 3,984,940 degraded in seven weeks 18.3 TALU and the same stabilizer system in example 4 required 12 weeks and 29.3 TALU. The difference in time was almost three months. In practice the film would degrade in 29 weeks one year and 7 weeks another year, and the farmer would extol the film one season, since it meets his needs, and complain vociferously the next season because the film broke down much sooner than desired.

Also, variations in processing conditions needed to obtain the desired reduction in TALU units can affect physical properties as well as outdoor stability. Polypropylene film made with minimal thermal history is stronger than a film made under more intense processing conditions. Thus, 12 melt index (MI) polypropylene film made without impact modifier has tensile strengths of 3780 and 2390 lb./sq.in and elongations of 530 and 550% in the machine and cross machine directions and 30 MI film made without impact modifier has corresponding tensile and elongation values of 2700 and 1720 lb./sq.in and 500 and 460%.

The prior art teaches that it is essential to increase thermal history in order to produce a film with controllable, reproducible, and predictable outdoor stability. It should be noted that this prior art teaching of a method of using a tailored thermal history in processing polypropylene has not produced a commercial degradable agricultural mulch polypropylene film. One of the reasons may be the difficulty in predicting OBC. The OBC of thin films made from propylene polymers are affected by molecular weight. For example, after seven weeks in an outdoor aging test in Princeton, New Jersey, none of the exposed 30 MI polypropylene strips were intact, whereas 67% of 12 MI polypropylene strips were still intact. Since thermal history may reduce molecular weight, but not always in predictable manner, it may also affect unpredictably the OBC of polypropylene films.

Since the breakdown of thin films of polypropylene can be quite rapid, it is imperative to control all processing variations by preventing degradation during processing, thereby reducing drastically the extent of thermal history. Rather than to allow an unknown amount of material to degrade during processing, since it is well known that the rate of oxidation is difficult to control and starts primarily at the useful high molecular weight chains which confer strength upon the film, and then try to stabilize the resin with light stabilizer to obtain a specific outdoor stability, we have found that by preventing and/or reducing thermal history to a minimum, we can make thin degradable films that are useful for many commercial applications.

In other words, some art teaches the use of degradants to destabilize the resin, and other art teaches degrading the resin and then adding small amounts of stabilizer. This invention retains the excellent physical properties of polypropylene, that is, keeps the change in outdoor stability due to processing, to less than 5000 TALU units. Rather than degrading the resin during processing, this invention retains the structure and molecular weight of the resin during processing by protecting the resin with sufficient antioxidant. In order to reduce the inherent stability of the film to useful levels, we use an elastomer. By this means we reduce the stability of the basic film by about 5 to 14 days. Then, we increase the stability of the resin in a controlled, reproducible, and predictable manner by adding carbon black of specific UV absorbing capacity. To further increase the stability of the film, it has been found surprisingly that small amounts of effective UV stabilizers can regulate and control degradation within narrow limits, and that small changes in the UV stabilizer system can extend stability by monthly increments, a very important property. In fact, it has been found that the outdoor stability of many useful mulch films can be regulated by the amount and type of filler, while keeping the amount of a specific type of UV stabilizer constant. Thus, for polypropylene films having a thickness by weight of 1.25 mils or less, it has been found that a thin commercial degradable film can be produced by minimizing breakdown during processing, because it is easier to reproduce the properties of a film by preventing the oxidation reaction with antioxidants than to allow the resin to oxidize in an extruder to some predetermined state. In addition, oxidation reactions may harm physical properties.

Processing

The degradation rates of thin plastic films are controlled and regulated in a uniform and predictable manner, by minimizing the amount of degradation of the resin during processing. This may be accomplished by using antioxidants to serve as melt stabilizers and to promote heat resistance. In addition, this invention may use other methods to prevent uncontrolled degradation during processing, including the use of 200 to 1500 ppm of a fluoroelastomer or 200 to 1500 ppm of an organosilane to lower drag and back pressure, and 500 to 2000 ppm of a lubricant such as calcium stearate to minimize sticking on the rolls and to lower temperatures during extrusion. However, once the amount and levels of these aids, and the antioxidant system have been optimized for a particular resin combination, set of extrusion conditions, and application, and amount of fluoroelastomer and lubricant have been determined, they are kept constant.

Degradation is prevented during processing conditions, in order to produce mulch films with improved stress-strain properties and to reduce noticeably the possibility for tear during application on the ground and during transplanting with mechanical and water-wheel transplanters.

However, for applications herein listed, it has been found that control and regulation of the OBC of thin degradable polypropylene films were obtained by controlling the amount of fillers of specific particle size in a masterbatch with known dispersion, and by matching the amount of hindered amine light stabilizer (HALS) stabilizer with the amount and particle size of carbon black, and/or by controlling the weight average molecular weight distribution of the polypropylene. For a particular composition, higher or lower rates of outdoor degradation may be obtained by adding higher or lower molecular weight polypropylene, and by adding amorphous material.

Antioxidants

For this invention, antioxidants are used to minimize the effects of degradation during processing. An antioxidant is a material that is designed to prevent oxidation and to inhibit reactions promoted by oxygen or peroxides. Antioxidants, as the term is used in this invention, are differentiated from ultraviolet stabilizers which are used to prevent actinic deterioration during outdoor weathering and are not effective, or minimally effective in preventing deterioration during fabrication of the polymer. Antioxidants include organic phosphites, phosphonites, and phosphates.

Antioxidants interrupt degradation processes by terminating chains and decomposing hydroperoxides. Those that interrupt the degradation processes include sterically hindered phenols and are termed primary antioxidants, or "radical scavengers." Those that decompose hydroperoxides are called secondary antioxidants, usually contain phosphorous, and are most effective at higher temperatures. Combinations of phenolic and phosphite and/or phosphonite antioxidants are supplied by many manufacturers.

Antioxidants are designed to control processing degradation and will not result in a thin film with significantly greater outdoor stability. Normal quantities of antioxidants do not increase the outdoor stability of thin films of polypropylene from 40 to 180 days. The materials are designed to reduce the degradation that normally occurs during processing and to which polypropylene is more prone than polyethylene and to which carbon black filled polypropylene is even more prone. The major function of the antioxidant is to prevent deterioration of polypropylene during processing and control photodegradability of said film. More particularly the function is to ensure that little significant breakdown occurs during processing, under 5000 TALU units, preferably under 2500 TALU units, and more preferably under 1000 TALU units, and that the OBC is not affected by a variable and unknown thermal history. Also, antioxidants are used to increase the use of scrap material without affecting the melt index of the resin.

The antioxidant system may be added to the polymer by dry blending, dispersion, solution in a suitable solvent, by adding to the resin immediately after polymerization, or in blends with the filler and/or elastomer. As the term is used within the scope of the present invention, the antioxidant system can vary within very wide limits and the amount and type needed will depend upon the specific set of processing conditions, production rate, extrusion temperatures, types and amounts of modifiers, types and amounts of polymers, amount of amorphous material, dispersion and particle size of the filler. All of these may affect the heat history of the film and the amount of antioxidant needed to minimize the effect of processing conditions on OBC.

The types of antioxidants include hindered phenols, a phenol-free antioxidant based on the zinc salt of an organic acid, 2,2-ethylidene-bis(4,6,-di-tert-butylphenol), and a blend of a high molecular weight phenol and tris(s,4-di-t-butylphenyl)phosphite.

Antioxidants include octadecyl 3,5-di-tert-butyl-4-hydroxyhydrocinnamate, tetrakis[methylene(3,5-di-tert-butyl-4-hydroxyhydrocinnamate)]methane, 1,3,5-trimethyl- 2,4,6-tris(3,5-di-tert-butyl-4-hydroxybenzyl)-benzene, thiodiethylene bis(3,5-di-tert-butyl-4-hydroxy)hydrocinnamate, N,N,-bis[3-(3′,5′di-tert-butyl-4-hydroxyphenyl)propanylhydrazine, calcium bis[monoethyl(3,5-di-tert-butyl-4-hydroxy-benzyl)phosphonate (50% with polyethylene wax), 1,3,5-tris(3,5-di-tert-butyl-4-hydroxybenzyl)-s-trizine 2,4,6(1H,3H,5H)trione, bis(2,4-di-t-butylphenyl)pentaerythritol diphosphite, with or without 1% by weight triisopropanol amine, tris(2,4-di-tert-butylphenyl)-phosphite, di-tert-butyl-phenylphosphonite condensation product with biphenyl- or tetrakis-(2,4-di-tert-butylphenyl(-4,4′-bi-phenylene-diphosphonite) and thiodialkanoic acid esters such as distearylthiodiproprionate and dilaurylthiodiproprionate.

For the purpose of reducing thermal history to a minimum, antioxidants are used at about 0.005 to 1%, preferably from 0.008 to 0.8%, more preferably from 0.01 to 0.5%, and most preferably from 0.02 to 0.3%.

Stabilizers

The prior art taught that degradable polypropylene films can be made with 0.05 to 5% by weight of carbon black and polypropylene and 0.005 to 2% stabilizer, or at least about 0.04% by weight of stabilizer. U.S. Pat. Nos. 3,896,585 and 3,984,940 included in the notion of stabilizers antioxidants which prevent thermal degradation and stabilizers that retard actinic degradation termed ultraviolet (UV) stabilizers. It is assumed that the 0.04% minimum amount of stabilizer refers to antioxidant and/or stabilizer.

It has been found that this present invention relates to the use of a specific class of ultraviolet (UV) stabilizers as optimum for providing extended outdoor stability, but less than 180 days of direct sunlight, for thin degradable mulch films based upon polypropylene. As disclosed in Chemical and Engineering News, September 25, 1989, p. 39, there are three general types of UV stabilizers. One class, which includes benzotriazoles, and substituted benzophenones, "screens the polymer by absorbing UV radiation and then dissipating the energy as heat. They require a high concentration to be effective and are less effective when the polymers are highly pigmented. A second class of UV stabilizers functions by 'quenching' molecules activated by UV radiation. These agents are typically nickel-based coordination complexes. The third type of stabilizer for UV protection are hindered amine light stabilizers (HALS), which interrupt the radical chain degradation mechanism." These stabilizers are generally based on a structural element, namely, tetramethyl piperidine, but other types of elements are being developed and come under the rubric of this invention.

It has been found unexpectedly that using the same amount of the expensive 2(3′,5′-di-tert-butyl-2-hydroxyphenyl) 5-chlorobenzotriazole with 1% furnace black (Sterling NS type) as shown in Example 4 of U.S. Pat. No. 3,896,585 did not extend the stability of thin 0.85 mil polypropylene film, compared to similar film without any UV stabilizer and reinforced with elastomer. Neither film contained additional antioxidant. See Example 1 of this invention. The second class listed in the prior art, U.S. Pat. No. 3,984,940, is that of nickel compounds, which is not useful since nickel is a heavy metal which does not receive FDA clearance.

As disclosed in this invention, outdoor stability can be increased by careful manipulation of the carbon level. It has been found unexpectedly that HALS UV type stabilizers can extend the outdoor stability of thin polypropylene films by relatively small periods of time by keeping the level of stabilizer relatively constant, and changing amount and type of carbon black, that is, using carbon blacks of different particle size to control outdoor stability for relatively small periods, under three months, preferably under two months, and more preferably for about one month.

Why is the success of HALS type stabilizers unexpected? Because of the excellent ability to this class of stabilizers to stabilize polyolefins, especially polypropylene, at low levels of stabilizer, it was unexpected to discover that they can be used to control and regulate the degradability of thin polypropylene films for periods under one year, especially under 180 days. HALS stabilizers are recommended for polypropylene fibers and tapes, because "they are effective at low concentrations." It was unexpected to discover that they can be used to produce commercial degradable polypropylene agricultural mulch films.

It is possible that they were omitted from the previous patents, primarily because of their great effectiveness in stabilizing polypropylene. They were not considered as possible UV stabilizers for controlling thin degradable polypropylene films under 1.5 mils.

In fact with as little as 0.125% finely dispersed UV-type carbon black, Ciba-Geigy states that 3% Tinuvin 622 in 2 mil polypropylene tapes provides 310+kiloLangleys of stability in Florida and that more black (0.625%) increases the stability to 500+KiloLangleys. Data by Ciba-Geigy showed that these low levels of carbon black and stabilizer confer more than enough stability on polypropylene, making them ineffective as degradable mulch films which require stabilities of 40 to 180 days in direct sunlight, or as little as 19 kiloLangleys. In fact, unpigmented film with 0.3% UV 622 lasted one year in Florida to 50% tensile retention, still a tough film.

These levels of stability are such so as dissuade their use in degradable mulch films. There is nothing in the prior art to suggest that polypropylene films containing these powerful combinations of HALS stabilizer and even higher carbon black levels (1.0 to 2%) would provide useful degradable mulch films. Also, the literature does not suggest that use of these powerful stabilizers in combination with about 0.5 to 1.6% of small size carbon black, a powerful UV absorber, would produce a commercial degradable polypropylene film that would degrade in less than one year, let alone under six months, or even four months.

It is important to note that under the rubric of stabilizers, the prior art details eight kinds of antioxidants and mentions several organic compounds for their ability to retard actinic degradation, namely benzophenones, substituted hydroxyphenyl benzotriazoles, and salicylates and nickel organic compounds. Benzophenones and substituted hydroxyphenyl benzotriazoles belong to the class of stabilizers that absorb UV radiation and nickel organic compounds belong to the class known as "quenchers." HALS stabilizers were not named in the patent, even though a comprehensive list of stabilizers was cited.

In addition, U.S. Pat. No. 3,984,940 did not identify the sensitive interaction between level and type of carbon black and level and type of ultraviolet stabilizer. Example 2 of this invention shows that film made with 1% of carbon black of 75 nm. which contained only 0.7% carbon black and 0.14 part of HALS type stabilizer, did not significantly extend the outdoor stability of polypropylene compared to film without stabilizer. Subsequent work with the same level of stabilizer, but with about 1.5% carbon black produced a film which lasted about 20 days in the weatherometer at 80° C., Xenon arc black body, 11.5/0.5 light/light-water. Based on data from a weatherometer and the field, this is equivalent to about 75 to 100 days in direct sunlight, a useful length of time for commercial degradable film for growing seeded watermelons in northern Florida and South Carolina.

Under the rubric of this invention, HALS stabilizers include bis(2,2,6,6-tetramenthyl-4-piperidyl)sebacate; bis(1,2,2,6,6,-pentamethyl-4-piperridinyl)sebacate; n-butyl(3,5-di-tert-butyl-4-hydroxybenzyl)bis-(1,2,2,6,6-pentamethyl-4-piperridinyl)malonate; N-N′-bis(2,2,6,6,-tetramethyl-4-piperidinyl)-1,6-hexanediamine, polymer with 2,4,6-trichloro-1,3,5-triazine and 2,4,4-trimethyl-1,2-petanamine; and preferably dimethyl succinate polymer with 4-hydroxy-2,2,6,6,-tetramethyl-1-piperidine ethanol. Others are hexane-1,6diamine; N, N'-bis(-2 2 6 6-tetramethyl-4-piperidinyl)-, polymer with 2,4-dichloro-6-(4-morpholinyl)-1,3,5-triazine; a high molecular weight tri-functional HALS based on tetramethyl-piperazinone made by B.F.Goodrich under tradename Goodrite 3150; and a HALS with a silicon back bone and tetramethyl-piperidine as a side chain made by Ferro Corporation under tradename Uvasil 299. Included are monomeric and oligomeric types, and ones based on piperidiene and piperazinone hindered amino groups.

Levels of HALS stabilizers are 0.02 to 0.4%, based on the weight of the film, from 0.05 to 0.2%, from 0.08 to 0.25, from 0.15 to to 0.28%, and 0.02 to 0.15% based upon the weight of the film. It is understood that some HALS stabilizers might be optimum at lower levels and some at higher levels, while still retaining their FDA clearance for use in polyolefins. Price, FDA clearance and outdoor stability are the determining factors. For example, the preferred HALS stabilizer costs 50% less than the substituted hydroxyphenyl benzotriazole stabilizer described in the prior art, and besides, 0.1% of HALS is more effective than 0.3% of benzotriazole type stabilizer.

It has surprisingly been found that HALS stabilizers which are claimed to be very effective and efficient stabilizers for polyolefins and which function, not by absorbing UV radiation, but by interrupting the free radical polymer chain degradation of the polymer can provide commercial degradable films. The prior art does not teach that thin films of polypropylene comprising HALS stabilizer may degrade within 180 days of direct sunlight and provide commercial degradable films.

Polymer

The polymer used in this invention may be the homopolymer of propylene, or it may be a co- or higher polymer of predominantly propylene with other co-polymerizable olefinically unsaturated monomers, such as ethylene, butylene, methyl-pentene, $C_6$-$C_{20}$ alpha olefins, styrene, butadiene, isoprene and the like. Further mixtures of propylene homopolymer with homo- or copolymers of other monomers are suitable and/or graft or block copolymers of these monomers may be used. Still further, polyolefins, of the amorphous and crystalline type, may be blended in quantities up to 40% with polypropylene for specific applications, whether present as a blend or copolymer, the content of propylene should be at least about 50% by weight of total monomer, advantageously at least about 60% and preferably at least about 70%. Up to 30% amorphous polypropylene may be added as a means of regulating the degree of degradation, both due to sunlight and microorganisms, but not polyethylene.

Preferred copolymers are those of propylene with either ethylene or butene, in which the comonomer is randomly dispersed in the propylene chain, or in which it is dispersed as blocks of polyethylene or polybutene. When blocks of the comonomer are used, the blocks may have a molecular weight of about 500 to 400,000 preferably about 1000 to 1000,00. The amount of comonomer can vary from 0.25% to as much as 20%, but preferably the amount should be from 0.5% to 15% and more preferably from 1 to 10%. Polypropylene in this invention can have a weight average molecular weight between about 500 to 2,000,000, preferably 1000 to 1,000,000 and more preferably between about 1,500 to 750,000. The polymer preferably is over 50% isotactic and more preferably over 70% isotactic, as measured by diethyl ether extraction. The polymer has a melt flow index between 0.01 to about 70,000, preferably between 0.2 and 7000, more preferably between 1 and 100, still more preferably between 3 and 60, still more preferably between 4 and 40, and most preferably between 10 and 35 (ASTM D1238-L).

Carbon Black

Prior art (U.S. Pat. No. 3,896,585) taught that some carbon blacks such as channel black impart too much stabilization to polyolefin films, so that the films do not break down during a normal growing season and have to be removed manually from the field. The prior art also taught that basic carbon blacks, not acidic carbon blacks, do not significantly affect the degradation rate of polyolefin films. They claimed 0.005 to 5% of furnace and thermal blacks having particle sizes of about 200 to 800A (20 to 80 nm) in combination with 0.005 to 2% by weight of stabilizer, and in claim 2 at least 0.04% by wt. of stabilizer with 0.2 to 3% preferably 1 to 2% by weight of black.

The prior art failed to define useful and commercial degradable mulch films. Commercial degradable mulch films must have predictable and reproducible outdoor stabilities. For example, a film that breaks down in 75 days one year and 35 days the next year is not a useful film. The prior art failed to disclose how to make degradable films that could be used for different crops using a variety of growing conditions.

The prior art did not consider the importance of thickness of film, type and amount of stabilizer, loading of black, and particle size of the black. For example, the prior taught that a 2 mil film, with 0.6% of finely dispersed UV-type carbon black and 0.3% HALS stabilizer would not break down within a year.

In fact, even staying below the preferred limits in U.S. Pat. No. 3,896,585 1 to 2%, film with 0.6% fine carbon black and 0.3% of HALS stabilizer would exceed the limit of one year.

What the prior art failed to teach was the prominent role of the particle size of carbon black in thin degradable films with respect to breakdown rates and ease of application.

It has been found unexpectedly that a close and commercially useful relationship exists between particle size of carbon black and amount of HALS stabilizer in thin degradable films. For example, with about 0.14% HALS stabilizer and about 1.5% carbon black of about 75 nm, the weatherometer life at 80° C. was about 20 days, and with the same amount of stabilizer and carbon black of 19 nm., the life in the weatherometer was 26 days. For most applications, this relatively small difference in days has no useful value, since for outdoor applications, the desired life is three or more years, certainly at least two years. But for degradable mulch films, this difference translates into about 100 days for one film and 130 days for the second film and provides useful films for different crops and growing conditions, since one film requires a minimum life of at least about 60 days and another a minimum life of about 100 days.

Of course, it would be possible, with carbon black of 19 nm to obtain a film with a shorter outdoor stability by reducing the stabilizer to a range of about 0.02 to 0.08, or by adding 0.02 to 0.05% of a larger particle size black. And more 75nm. carbon black would increase the stability of the former film to 20 days. In summary, the prior art did not consider particle size of the carbon black and its relationship with UV stabilizer, breakdown rate, crop and growing conditions. Still further, such carbon black is used preferably as a dispersion in the film of about 1A to 5A as determined by the "smear-out" method as set forth in Technical Report S-31, DISPERSION OF CARBON BLACK FOR PLASTICS, Cabot Corporation (FIG. 7, page 16).

In the present invention, it has been found that for films of polypropylene and propylene copolymers, of about 1.25 mils or less, that control and regulation of photodegradation of the film to the embrittlement stage between forty (40) to one hundred and eighty (180) days of direct sunlight, which is critical for the grower, that is, the film must be stable until a certain period, and then reach the embrittlement stage by the end of the harvest season or within a reasonable and practical period after harvesting, that this photodegradation control and regulation may be obtained by adjusting the amount and type of carbon black which is used as the sole UV absorber, by adjusting the amount and type of HALS UV stabilizer which interrupts free radical reactions, and/or by matching the type and amount of black with a HALS stabilizer for each specific application.

It is important to acknowledge that surface area and oil absorption of carbon black affect the light stabilizing properties and ease of dispersion in polypropylene. Average particle size is used to capture the different properties of blacks, knowing that other factors might affect usage for a specific application. Using a carbon black of a different particle size, in the range from about 15 to 120 nanometers, and having a specific dispersion in a masterbatch, can produce real changes in the OBC of thin degradable polypropylene films.

In accordance with the teachings of the present invention, carbon black comprises about 0.5% to 2.4% by weight of the film and has an average particle size of about 15 nm. to 120 nm. Also, for 50-110 day films of polypropylene with a thickness by weight of about 1.25 mils or less, the 50-120 nm. carbon black level should be from 0.9 to 2.4% and with 15-40 nm carbon black, the black level should be from 0.6 to 1.3% based on the weight of film. For 80-180 days degradable films of polypropylene having a thickness by weight of 1.25 mil or less, the 15-40 nm. carbon black level should be from about 0.6 to 1.6%, and with 60-120 nm carbon black level, the level should be from about 1.3 to 2.4%.

Within these levels, it is understood that decreasing the thickness of the film will increase the levels of black needed for a specific application. It is also understood, that combinations of the carbon blacks can be used to obtain similar results.

Impact Modifiers

Impact modifiers have been know for over a decade as ways to modify the impact strength of polypropylene. Further it is well known, according to the theory, that the rubber particles are incompletely blended into the polymer matrix and serve to prevent cracks from travelling through a brittle plastic. The impact forces are absorbed and then dissipated by the rubber; the tension crack does not travel further into the product.

However, the improvement of impact strength by rubber polymers is complicated by the need to obtain some adhesion between the rubber particle and the plastic matrix, for if the adhesion is poor, the crack travels around the interface. This theory and history is well known. Though some patents and literature discuss the use of these modifiers to improve the impact strength of moldings of polypropylene and even the impact strength at room and low temperatures of low density polyethylene films, and also discuss that in crystalline high density polyethylene films having a thickness of 4 mils, impact modifiers enhance impact strength at low temperatures and tear strength, while lowering tensile strength in the machine and cross-machine directions, there has been no prior work to show the effect of these modifiers upon the outdoor stability and elongation at low temperatures of very thin degradable films of crystalline polypropylene, such as degradable agricultural mulch films.

In addition, brochures on the use of butadiene/styrene copolymers as an impact modifier refer only to moldings of polystyrene, polyethylene, and polypropylene and to films of (LLDPE) linear low density polyethylene having a thickness of 3.1 and 1.4 mils. The brochure shows that this type of impact modifiers improve impact strength and tear strength in the cross-machine direction while reducing tensile strength in both directions and tear strength in the machine direction. The modifiers had little effect on elongation. The brochures do not mention use of the elastomers in thin polypropylene films and do not even provide give data on low temperature elongation properties of LLDPE films.

In fact, a well-known company that makes impact modifiers only tests slabs of 75-mils thickness for tear strength using Die R, having little experience with thin polypropylene films. And some articles by researchers at Shell and Exxon mention the use of impact modifiers in high and low density polyethylene for film applications. But when they mention polypropylene, they discuss the use of impact modifiers for ski boots, obviously not contemplating the use of modifiers for thin degradable films of polypropylene, and differentiating between the two polyolefins.

Thus, no work has been done to improve with modifiers the low temperature properties of degradable agricultural mulch films composed of polypropylene, which are not produced commercially because of its poor low temperature properties.

No work has been done to show how modifiers may reduce stability, so that carbon black and effective stabilizers can be used to control degradability and produce reproducible and predictable degradability in thin films.

This is understandable, since whereas rubber particles enhance the impact strength of moldings of polypropylene by their incompatibility, this same property, on the basis of polymer theory, would serve to harm the stress-strain properties and flexibility of thin films of about 1.25 mils, or less. Rubber particles might serve as foci for breaks in the film. It would be expected that the rubber particles would interfere with the crystalline structure of thin polypropylene film, even disturbing the orientation that gives polypropylene its strength. So it is surprising that certain elastomers would increase the elongations at low temperatures of thin polypropylene films of the nature used in degradable mulch films and other types of thin film applications, since these modifiers are incompletely blended into polypropylene. Stress-strain properties at 0° C. and minus 20° C. of polypropylene films made with and without impact modifier follow:

| Polymer | 12 MI | 12 MI | 30 MI | 30 MI |
|---|---|---|---|---|
| Modifier | None | 10% | None | 9.3% |
| Tensile St. at 0° C. | 5700 | 5650 | 3830 | 3560 |
| Elongation at 0° C. | 430 | 500 | 240 | 390 |
| Tensile St. at −20° C. | 3850 | 4670 | 2600 | 2720 |
| Elongation at −20° C. | 10 | 150 | 10 | 90 |

Black film (XQ-1707) made with HALS stabilizer had elongation values in the machine direction of 340% at 0° C. and 280% at minus 20° C. and black film without modifier had comparable values of 250% and 210%.

It is also surprising that impact modifiers lowered the ratio of tensile strength in the machine direction to that in the cross-machine direction. The modifier lowered the tensile strength in the machine direction but had much less effect on the tensile in the cross-machine direction, thereby producing a more balanced film. In other words, the modifier interfered with the crystallinity of the film in the machine directions and not in the cross-machine direction. The properties of 12 MI polypropylene film made with and without impact modifier are:

| Modifier | None | 10% | None | 10% |
|---|---|---|---|---|
| Tensile Str., psi Elongation, % | | | | |
| Machine direction | 3780 | 2910 | 530 | 560 |
| Cross-machine | 2390 | 2320 | 550 | 570 |

The impact modifiers must also be of such a nature that when in the field and exposed to sunlight, the particle-polypropylene network should not impede the general deterioration of polypropylene into small particles which are amenable to degradation by soil microorganisms. These modifiers should not delay unduly the breakdown of the film beyond the end of the growing season nor encourage the film to break down into large pieces and become a hazard to the farmer. Polymers which form valence cross-links, upon oxidation such as polyethylene, make the film less friable and more difficult to pick up.

In fact, it has been found that impact modifiers, especially unsaturated terpolymers such as those made with hexadiene, ethylidene norbornylene, dicyclopentadiene, and copolymers of butadiene and styrene enhance the degradability of polypropylene films.

Thus 12 MI polypropylene film without modifier was stable after 5.3 weeks in outdoor test in New Jersey and after 7.4 weeks, 50% of the strips were still intact. In 6.4 weeks 44% of 12 MI film with 10% impact modifier were intact and none remained after 7.4 weeks. After 5.3 weeks all of 30 MI polypropylene made without mofifier was intact. It degraded after 7 weeks. With modifier, all of 30MI polypropylene film degraded within 5.3 weeks. Outdoor stability in New Jersey of polypropylene films made with and without modifer follow:

| Run Weeks | MI | Impact Mod. % | Age Resist., % | | | | |
|---|---|---|---|---|---|---|---|
| | | | 3.3 | 5.3 | 6.4 | 7 | 7.4 |
| 1 | 12 | 0 | 100 | 100 | 89 | 67 | 50 |
| 4 | 12 | 10 | 100 | 100 | 44 | | 0 |
| 2 | 30 | 0 | 100 | 100 | | 0 | |
| 3 | 30 | 10 | 100 | 0 | | | |

Included in the list of modifiers that can aid the low-temperature (0° C. and lower) properties of polypropylene and copolymers of propylene are rubbery polymers, such as copolymers of ethylene and propylene, terpolymers of ethylene, propylene, and hexadiene, dicyclopentadiene, ethylidene norbornylene, and other dienes, copolymers of ethylene and vinyl acetate, ranging from 5% vinyl acetate to 50% vinyl acetate, copolymers of butadiene and styrene, copolymers of butene-1 and ethylene, and copolymers of propylene and butene-1 and polyurethanes, copolymers and terpolymers to which have been grafted different monomers, such as maleic anhydride.

Preferred modifiers for polypropylene and copolymers of propylene are terpolymers of ethylene, propylene, and a diene, and copolymers of butene-1 and ethylene, ethylene and propylene, propylene and butene-1, and butadiene and styrene. Most preferred are terpolymers of propylene, ethylene, and a diene and copolymers of butene-1 and ethylene. Of dienes, preferred are hexadiene, ethylidene norbornylene, and dicyclopentadiene, and most preferred are hexadiene. Of copolymers of butene-1 and ethylene, most preferred are those with more than 85% butene-1.

It has been found that to be useful in obtaining a flexible strong film at low temperatures it is important that the modifier be preblended with high density polyethylene and/or polypropylene of a lower melt index for maximum stress-strain properties at low temperatures. The total amount of modifier is usually blended with a homopolymer or a copolymer of propylene. The total amount of modifier is between 1% to 40% by weight of the film, preferably 3% to 30%, and more preferably 5% to 25%. The modifier may be blended with 10 to 60% of high density polyethylene and/or 5 to 30% of polypropylene.

Existing degradable agricultural mulches as described in U.S. Pat. Nos. 3,984,940, 3,896,585, and 3,886,683 meet some needs of farmers, but have certain limitations, and do not mention the use of impact modifiers to provide commercial degradable films of polypropylene. Those based on polybutene have limitations of high price and consequent limited production, making it unavailable for many farmers, and also limitations in usage, due to the difficulty in making the film sufficiently thin to make the cost of the film attractive to growers.

Those based on polypropylene, as described in U.S. Pat. No. 3,984,940, have the limitation that they cannot be placed down in the early stages of cultivation because they have poor stress-strain properties at low temperatures, becoming very brittle and are easily ripped by sharp weeds or by animals. Polypropylene has the additional disadvantage of poor flexibility during cool weather, so that rips are more likely to occur during the placement of the film and during mechanical transplanting, and which once formed can grow across the width and length of the film, exposing the baby plant to cold weather and water loss, the very outcomes for which the mulch was developed to prevent.

Breaks in the film, that occur either due to poor stress-strain properties at low temperatures or due to poor flexibility at normal and low temperatures, or due to an imbalance of stress-strain properties allow the wind to get under the film. When this happens, large pieces of film can be blown away during the early stages of plant growth. These shortcomings have limited the commercialization of degradable mulch films based upon polypropylene when such degradable-type films are greatly needed as mulch films to assist farmers to increase early maturity and to improve total and early crop yields, and reduce fertilizer and water requirements.

It will be further understood that in accordance with the teachings of the present invention the film for photodegrading between 40 and 180 days of direct sunlight and wherein such film is polypropylene having a melt flow index of about 4 to 40 as determined by ASTM D1238L, may further include additional polypropylene having a melt flow index of greater than 30 as determined by ASTM D1238L for shortening the time to the embrittlement stage and wherein the additional polypropylene comprises about 1% to 50% by weight of the film. Further, such additional polypropylene may comprise about 3% to 40% by weight of the film or may comprise approximately 5% to 30% by weight of the film.

Still further, it will be understood that in accordance with the teachings of the present invention the degradation of the photodegradable film of the present invention may be enhanced by including additional polypropylene having a melt flow index of 60 or greater as determined by ASTM D1238L and wherein such additional polypropylene comprises about 0.5% to 40% by weight 60 or greater as determined by ASTM D1238L and wherein such additional polypropylene comprises about 1% to 30% by weight of the film and may further comprise about 3% to 25% by weight of the film.

It will be understood that the expression "embrittlement stage" as used herein includes several stages in which during the initial stage of embrittlement the photodegradable film becomes brittle, but maintains its form and continuity and therefore its protective character is substantially unaltered. In the second stage, the film becomes more brittle and can be readily broken up by the mechanical action of a soil tilling or cultivating implement, e.g. a plow or harrow or cultivator. During this stage, the film has little or no flexibility being characterized by a substantially lowered elongation. During the following stages of embrittlement, the elongation falls substantially equal to zero and the film continues to degrade until it is friable and breaks up into very small dust like pieces. The photodegraded film is amenable to biodegradation.

Examples of a process for controlling the photodegradation of polypropylene films follow:

EXAMPLE 1

About 775 pounds of polypropylene resin containing calcium stearate with a melt flow of 4, 150 pounds of a 67/33 blend of ethylene/propylene/hexadiene terpolymer (impact modifier) and high density polyethylene, and about 50 pounds of a blend of 74% polypropylene, 20% furnace carbon black (UV absorbing stabilizer) of about 75 nm. particle size and a surface area of 25 square meters per gram, and 6% Tinuvin 327 (additional UV light absorbing stabilizer of the substituted benzotriazole type) were fed to a commercial cast extruder and converted into cast film (XQ-1571) having a thickness of 0.9 mil. The furnace carbon black had an average particle size of 75 nm. and a surface area of 25 square meters per gram and dispersion of 2A or better as determined by the Spot-Out technique.

EXAMPLE 2

About 800 pounds of polypropylene resin containing calcium stearate with a melt flow of four, 150 pounds of a 67/33 blend of ethylene/propylene/hexadiene terpolymer (impact modifier) and high density polyethylene, and about 50 pounds of a blend of 80% polypropylene and 20% furnace carbon black (UV absorbing stabilizer) of about 75 nm. particle size and a surface area of 25 square meters per gram were fed to a commercial cast extruder and converted into cast film (XQ-1573) having a thickness of 0.9 mil. The furnace carbon black had an average particle size of 75 nm. and a surface area of 25 square meters per gram and dispersion of 2C as determined by the Spot-Out technique.

Experimentally, the XQ-1571 (Example 1) and XQ-1573 films were applied by an Ohio State University agricultural specialist on Mar. 19, 1987 on a farm near Columbus, Ohio. By May 20, 1987 the XQ-1571 film was torn and ripped, and the XQ-1573 film, though brittle, was still intact.

Samples of both films XQ-1571 and XQ-1573 were placed on the ground experimentally in early June 1987 at the Rutgers Agricultural Research Farm in Bridgeton, N.J. and within a week of film application, peppers transplanted; both films were intact on July 8th. About four weeks after application, 35% of XQ-1571 film had split, but XQ-1573 film did not show any breaks. After eight weeks, August 7th, XQ-1573 film had less breakdown than did XQ-1571 film; XQ-1573 film was brittle but intact. The crew began to pick peppers in the middle of July 1987 and picked them every 10 days. Soil exposure figures in October averaged 80% for XQ-1571 film and 40% for XQ-1573 film. XQ-1571 film stayed intact even though it was very brittle. At the end of the season, both films were quite brittle, had reached the embrittlement stage, and the field was plowable.

EXAMPLE 3

About 116. pounds of polypropylene resin with a melt flow index of 12, 21 pounds of a 50/25/24.75/0.25 blend of a ethylene/propylene/1,4-hexadiene terpolymer having a 40 ML-4 Mooney Viscosity at 121° C. and an ethylene content of 55%, high density polyethylene of 18 MI, polypropylene of 30 MI, and tetrakis[methylene(3,5-di-tert-butyl-4-hydroxyhydrocinnamate)]methane, and tris(2,4-di-tert-butylphenyl)phosphite and 12.8 pounds of a blend of polypropylene, 20% of furnace carbon black with an average particle size of about 75 nm. and a surface area of 140 square meters per gram and 2.22% dimethyl succinate polymer with 4-hydroxy-2,2,6,6,-tetramethyl-1-piperidine ethanol, and 0.44% of tetrakis[methylene(3,5-di-tert-butyl-4-hydroxyhydrocinnamate)]methane, and tris(2,4-di-tert-butylphenyl)phosphite were fed to a pilot plant cast extruder and converted into about 1 mil cast film containing about 0.19 part UV which had a UV absorbance of 134.

This film was tested in an outdoor stability test in Princeton, New Jersey, starting on August 13. After 91 days, 100% of the strips were intact, This film lasted 20 days in the weatherometer at 80° C., compared to 9 days for film made with light absorbing ultraviolet stabilizer in Example 1 and to film made without stabilizer as in Example 2.

EXAMPLE 4

About 740 pounds of polypropylene resin with a melt flow index of 12, 180 pounds of a 50/25.2/24.6/blend of a ethylene/propylene/ethylidene norbornylene terpolymer having a 31 ML 1+8 Mooney Viscosity at 100° C., 3.7% ethylidene norbornylene, and an ethylene content of 56%, high density polyethylene of 18 MI, polypropylene of 30 MI, and containing 0.2% of tetrakis[methylene(3,5-di-tert-butyl-4-hydroxyhydrocinnamate)]methane, and tris(2,4-di-tert-butylphenyl)phosphite and 80 pounds of a blend of polypropylene, 20% of furnace carbon black with an average particle size of about 75 nm. and a surface area of 25 square meters per gram and 2% dimethyl succinate polymer with 4-hydroxy-2,2,6,6,-tetramethyl-1-piperidine ethanol and 0.5% of tetrakis[methylene(3,5-di-tert-butyl-4-hydroxyhydrocinnamate)]methane, and tris(2,4-di-tert-butylphenyl)phosphite were fed to a commercial cast extruder and converted into cast film of about 1 mil.

The film can be used as an agricultural mulch film in South Carolina and will degrade within a period of 50 to 110 days.

EXAMPLE 5

About 740 pounds of polypropylene resin with a melt flow index of 12, 180 pounds of a 37.5/12.5/25.35/24.35 blend of a ethylene/propylene/1,4-hexadiene terpolymer having a 31 ML 1+8 Mooney Viscosity at 100° C., 5.5% hexadiene, and an ethylene content of 53%, ethylene/propylene/1,4-hexadiene terpolymer having a 57 ML 1+1292 8 Mooney Viscosity at 100° C., an ethylene content of 55%, and 3.5% hexadiene, high density polyethylene of 18 MI, polypropylene of 30 MI, and containing 0.3% of tetrakis[methylene(3,5-di-tert-butyl-4-hydroxyhydrocinnamate)]methane, and tris(2,4-di-tert-butylphenyl)phosphite and 80 pounds of a blend of polypropylene, 20% of furnace carbon black with an average particle size of about 75 nm. and a surface area of 25 square meters per gram and 2.35% dimethyl succinate polymer with 4-hydroxy-2,2,6,6,-tetramethyl-1-piperidine ethanol and 0.75% of tetrakis[methylene(3,5-di-tert-butyl-4-hydroxyhydrocinnamate)]methane, and tris(2,4-di-tert-butylphenyl)phosphite were fed to a commercial cast extruder and converted into cast film of about 1.1 mil. The film had 1.8% black.

The film (ST20) was tested in a weatherometer at 80° C. and became brittle in 20 days. The same film was used as an agricultural mulch film in Molokai, Hi. and lasted for more 75 days. The film degraded within 120 days.

EXAMPLE 6

About 760 pounds of polypropylene resin with a melt flow index of 12, 150 pounds of a 67/33 blend of a terpolymer of ethylene/propylene/hexadiene (impact modifier) and high density polyethylene, and about 90 pounds of a blend of polypropylene, 20% furnace carbon black (UV absorbing stabilizer) of about 75 nm. particle size and a surface area of 25 square meters per gram, and 3% dimethyl succinate polymer with 4-hydroxy-2,2,6,6,-tetramethyl-1-piperidine ethanol and 0.75% of tetrakis[methylene(3,5-di-tert-butyl-4-hydroxyhydrocinnamate)]methane, and tris(2,4-di-tert-butylphenyl)phosphite were fed to a commercial cast extruder and converted into cast film of about 0.9 mil. The film had 1.8% black.

The film (No. XQ-1707) had an elongation of 340% and 35% at 0° C. in the machine and transverse directions and of 280% and 15% in the machine and transverse directions at minus 20° C. which compared to a polypropylene film made without modifier and with carbon black (No. 8531) whose corresponding values were 250 and 12% at 0° C. and 210 and 10% at minus 20° C.

The film was tested in a weatherometer at 80° C. and became brittle in 26 days. The same film was used as an agricultural mulch film for growing seeded watermelons in South Carolina and lasted throughout the watermelons season. The film was exposed to about 60 days of sunlight before the runners covered the film. At the end of the season the film was brittle and was readily plowed into the soil.

EXAMPLE 7

About 800 pounds of polypropylene resin with a melt flow index of 12, 150 pounds of a 37.5/12.5/25.35/24.35/.3 blend of ethylene/propylene/1,4-hexadiene terpolymer having a 31 ML 1+8 Mooney Viscosity at 100° C., 5.5% hexadiene, and an ethylene content of 53%, ethylene/propylene/1,4-hexadiene terpolymer having a 57 ML 1+8 Mooney Viscosity at 100° C., an ethylene content of 55%, and 3.5% hexadiene, high density polyethylene of 18 MI, polypropylene of 30 MI, and tetrakis[methylene(3,5-di-tert-butyl-4-hydroxyhydrocinnamate)]methane, and tris(2,4-di-tert-butylphenyl)phosphite and 50 pounds of a blend of polypropylene, 20% of furnace carbon black with an average particle size of about 19 nm. and a surface area of 140 square meters per gram and 2.35%. dimethyl succinate polymer with 4-hydroxy-2,2,6,6,-tetra-methyl-1-piperidine ethanol, and 0.75% of tetrakis[methylene(3,5-di-tert-butyl-4-hydroxyhydrocinnamate)]methane, and tris(2,4-di-tert-butylphenyl)phosphite were fed to a commercial cast extruder and converted into 1.1 mil cast film with an average carbon black content of 1.0%, indicating a UV content of 0.12 part.

This film (ST30) lasted about 26 days in the weatherometer at 80° C. The same film was placed in a field in Hawaii on October 12, as an agricultural mulch film and lasted more than four months. The film degraded within 180 days.

EXAMPLE 8

About 740 pounds of polypropylene resin with a melt flow index of 12, 180 pounds of a 37.5/12.5/25.35/24.35/blend of a ethylene/propylene/1,4-hexadiene terpolymer having a 31 ML 1+8 Mooney Viscosity at 100° C., 5.5% hexadiene, and an ethylene content of 53%, ethylene/propylene/1,4-hexadiene terpolymer having a 57 ML 1+8 Mooney Viscosity at 100° C., an ethylene content of 55%, and 3.5% hexadiene, high density polyethylene of 18 MI, polypropylene of 30 MI, and containing 0.3% of tetrakis[methylene(3,5-di-tert-butyl-4-hydroxyhydrocinnamate)] methane, and tris(2,4-di-tert-butylphenyl)phosphite and 80 pounds of a blend of polypropylene, 20% of furnace carbon black with an average particle size of about 75 nm. and a surface area of 25 square meters per gram and 1.7% dimethyl succinate polymer with 4-hydroxy-2,2,6,6,-tetramethyl-1-piperidine ethanol and 0.75% of tetrakis[methylene(3,5-di-tert-butyl-4-hydroxyhydrocinnamate)]methane, and tris(2,4-di-tert-butylphenyl)phosphite were fed to a commercial cast extruder and converted into cast film of about 1 mil.

The film (XEM) was used as an agricultural mulch film in South Carolina and will degrade within a period of 50 to 110 days.

EXAMPLE 9

About 750 pounds of polypropylene resin with a melt flow index of 12, 190 pounds of a 37.5/12.5/25.35/24.35/0.3 blend of ethylene/propylene/1,4-hexadiene terpolymer having a 31 ML 1+8 Mooney Viscosity at 100° C. 5.5% hexadiene, and an ethylene content of 53%, ethylene/propylene/1,4-hexadiene terpolymer having a 57 ML 1+8 Mooney Viscosity at 100° C., an ethylene content of 55%, and 3.5% hexadiene, high density polyethylene of 18 MI, polypropylene of 30 MI, and tetrakis[methylene(3,5-di-tert-butyl-4-hydroxyhydrocinnamate)]methane, and tris(2,4-di-tert-butylphenyl)phosphite and 60 pounds of a blend of polypropylene, 20% of furnace carbon black with an average particle size of about 19 nm. and a surface area of 140 square meters per gram and 1.7%. dimethyl succinate polymer with 4-hydroxy-2,2,6,6,-tetra-methyl-1-piperidine ethanol, and 0.75% of tetrakis[-methylene(3,5-di-tert-butyl-4-hydroxyhydrocinnamate)]methane, and tris(2,4-di-tert-butylphenyl)phosphite were fed to a commercial cast extruder and converted into 1 mil cast film.

The film will degrade within a period of 80 to 180 days in a field in Hawaii.

EXAMPLE 10

About 730 pounds of polypropylene resin with a melt flow index of 12, 150 pounds of a 37.5/12.5/25.35/24.35/blend of a ethylene/propylene/1,4-hexadiene terpolymer having a 31 ML 1+8 Mooney Viscosity at 100° C., 5.5% hexadiene, and an ethylene content of 53%, ethylene/propylene/1,4-hexadiene terpolymer having a 57 ML 1+8 Mooney Viscosity at 100° C., an ethylene content of 55%, and 3.5% hexadiene, high density polyethylene of 18 MI, polypropylene of 30 MI, and containing 0.3% of tetrakis[methylene(3,5-di-tert-butyl-4-hydroxyhydrocinnamate)]methane, and tris(2,4-di-tert-butylphenyl)phosphite and 120 pounds of a blend of polypropylene, 20% of furnace carbon black with an average particle size of about 75 nm. and a surface area of 25 square meters per gram and 0.25% dimethyl succinate polymer with 4-hydroxy-2,2,6,6,-tetramethyl-1-piperidine ethanol and 0.4% of tetrakis[methylene(3,5-di-tert-butyl-4-hydroxyhydrocinnamate)]methane, and tris(2,4-di-tert-butylphenyl)phosphite were fed to a commercial cast extruder and converted into cast film of about 0.85 mil.

The film can be used as an agricultural mulch film for growing staked tomatoes in North Carolina and will degrade within a period of 50 to 110 days.

EXAMPLE 11

About 760 pounds of polypropylene resin with a melt flow index of 12, 190 pounds of a 37.5/12.5/25.35/24.35/0.3 blend of ethylene/propylene/1,4-hexadiene terpolymer having a 31 ML 1+8 Mooney Viscosity at 100° C. 5 5% hexadiene, and an ethylene content of 53%, ethylene/propylene/1,4-hexadiene terpolymer having a 57 ML 1+8 Mooney Viscosity at 100° C., an ethylene content of 55%, and 3.5% hexadiene, high density polyethylene of 18 MI, polypropylene of 30 MI, and tetrakis[methylene(3,5-di-tert-butyl-4-hydroxyhydrocinnamate)]methane, and tris(2,4-di-tert-butylphenyl)phosphite and 50 pounds of a blend of polypropylene, 20% of furnace carbon black with an average particle size of about 19 nm. and a surface area of 140 square meters per gram and 1%. dimethyl succinate polymer with 4-hydroxy-2,2,6,6,-tetra-methyl-1-piperidine ethanol, and 0.4% of tetrakis[-methylene(3,5-di-tert-butyl-4-hydroxyhydrocinnamate)]methane, and tris(2,4-di-tert-butylphenyl)phosphite were fed to a commercial cast extruder and converted into 0.85 mil cast film.

The film will degrade within about 50 to 110 days in a field in New Jersey.

EXAMPLE 12

About 740 pounds of polypropylene resin with a melt flow index of 12, 180 pounds of a 50/25.45/24.35/0.2 blend of a ethylene/propylene/ethylidene norbornylene terpolymer having a 31 ML 1+8 Mooney Viscosity at 100° C., 3.7% ethylidene norbornylene, and ethylene content of 56%, high density polyethylene of 18 MI, polypropylene of 30 MI, and tetrakis[methylene(3,5-di-tert-butyl-4-hydroxyhydrocinnamate)]methane, and tris(2,4-di-tert-butylphenyl)phosphite and 80 pounds of a blend of polypropylene, 20% of furnace carbon black with an average particle size of about 75 nm. and a surface area of 25 square meters per gram and 2% dimethyl succinate polymer with 4-hydroxy-2,2,6,6,-tetramethyl-1-piperidine ethanol and 0.5% of tetrakis[methylene(3,5-di-tert-butyl-4-hydroxy-hydrocinnamate)]methane, and tris(2,4-di-tert-butylphenyl)phosphite were fed to a commercial cast extruder and converted into cast film of about 1 mil.

The film can be used as an agricultural mulch film in South Carolina and will degrade within a period of 50 to 110 days.

EXAMPLE 13

About 810 pounds of polypropylene resin with a melt flow index of 12, 160 pounds of a 50/25/24.75/0.25 blend of ethylene/propylene/dicyclopentadiene terpolymer having a 54 ML 1+8 Mooney Viscosity at 100° C., 6.8% dicyclopentadiene, high density polyethylene of 18 MI, polypropylene of 30 MI, and 0.25% of tetrakis[methylene(3,5-di-tert-butyl-4-hydroxyhydrocinnamate)]methane, and tris(2,4-di-tert-butylphenyl)phosphite and 30 pounds of a blend of polypropylene, 20% of furnace carbon black with an average particle size of about 19 nm. and a surface area of 140 square meters per gram and 5% N-N'-bis(2,2,6,6,-tetramethyl-4-piperidinyl)-1,6-hexanediamine polymer with 2,4,6-trichloro-1,3,5-triazine and 2,4,4-trimethyl-1,2-pentanamine, and 0.5% of tetrakis[methylene(3,5-di-tert-butyl-4-hydroxyhydrocinnamate)]methane, and tris(2,4-di-tert-butylphenyl)phosphite can be converted into 1 mil cast film which will degrade within a period of 50 to 110 days in a field for growing seeded watermelons.

EXAMPLE 14

About 775 pounds of polypropylene resin with a melt flow index of 12, 160 pounds of a 50/25/24.75/blend of 43/57 styrene/butadiene copolymer, high density polyethylene of 18 MI, polypropylene of 30 MI, and 0.25% of tetrakis[methylene(3,5-di-tert-butyl-4-hydroxyhydrocinnamate)]methane, and tris(2,4-di-tert-butylphenyl)phosphite and 65 pounds of a blend of polypropylene, 20% of furnace carbon black with an average particle size of about 19 nm. and a surface area of 140 square meters per gram and 0.31% N-N'-bis(2,2,6,6,-tetramethyl-4-piperidinyl)-1,6-hexanediamine polymer with 2,4,6-trichloro-1,3,5-triazine and 2,4,4-trimethyl-1,2-pentanamine, and 0.5% of tetrakis[methylene(3,5-di-tert-butyl-4-hydroxyhydrocinnamate)]methane, and tris(2,4-di-tert-butylphenyl)phosphite can be made into 1 mil film by a commercial cast extruder.

The film will degrade within a period of 50 to 110 days in a field for growing transplanted watermelons in North Carolina.

EXAMPLE 15

About 760 pounds of polypropylene resin with a melt flow index of 12, 160 pounds of a 50/25/24.75/blend of 78/22 styrene/butadiene copolymer, high density polyethylene of 18 MI, polypropylene of 30 MI, and containing 0.25% of tetrakis[methylene(3,5-di-tert-butyl-4-hydroxyhydrocinnamate)]methane, and tris(2,4-di-tert-butylphenyl)phosphite and 80 pounds of a blend of polypropylene, 20% of furnace carbon black with an average particle size of about 19 nm. and a surface area of 140 square meters per gram and 1% N-N'-bis(2,2,6,6,-tetramethyl-4-piperidinyl)-1,6-hexanediamine polymer with 2,4,6-trichloro-1,3,5-triazine and 2,4,4-trimethyl-1,2-pentanamine, and 0.5% of tetrakis[methylene(3,5-di-tert-butyl-4-hydroxyhydrocinnamate)]methane, and tris(2,4-di-tert-butylphenyl)phosphite can be fed to a commercial cast extruder and can be converted into 1 mil cast film.

The film will degrade within a period of 80 to 180 days in a field for growing peppers in Hawaii.

EXAMPLE 16

About 795 pounds of polypropylene resin with a melt flow index of 12, 180 pounds of a 37.5/12.5/25/23.5/.5 blend of a ethylene/propylene/1,4-hexadiene terpolymer having a 31 ML 1+8 Mooney Viscosity at 100° C. 5.5% hexadiene, and an ethylene content of 53%, ethylene/propylene/1,4-hexadiene terpolymer having a 57 ML 1+8 Mooney Viscosity at 100° C., an ethylene content of 55%, and 3.5% hexadiene, high density polyethylene of 18 MI, polypropylene of 30 MI, fluoroelastomer, 0.3% of tetrakis[methylene(3,5-di-tert-butyl-4-hydroxyhydrocinnamate)]methane, and tris(2,4-di-tert-butylphenyl)phosphite and 0.7% dimethyl succinate polymer with 4-hydroxy-2,2,6,6,-tetramethyl-1-piperidine ethanol and 25 pounds of a blend of polypropylene, 20% of furnace carbon black with an average particle size of about 75 nm. and a surface area of 25 square meters per gram and 5% dimethyl succinate polymer with 4-hydroxy-2,2,6,6,-tetramethyl-1-piperidine ethanol and 2% of tetrakis[methylene(3,5-di-tert-butyl-4-hydroxyhydrocinnamate)]methane, and tris(2,4-di-tert-butylphenyl)phosphite were fed to a commercial cast extruder and converted into cast film of about 1.1 mil. The draw pressure and die-build up were notably less those in Example 5.

Also, the polymer will have better outdoor stability and a better balance of physical properties than film made without fluoroelastomer. The film can be used as an agricultural mulch film in Delaware and will degrade within a period of 80 to 180 days.

EXAMPLE 17

About 785 pounds of polypropylene resin with a melt flow index of 12, 190 pounds of a 37.5/12.5/25.65/24.35 blend of ethylene/propylene/1,4-hexadiene terpolymer having a 31 ML 1+8 Mooney Viscosity at 100° C., 5.5% hexadiene, and an ethylene content of 53%, ethylene/propylene/1,4-hexadiene terpolymer having a 57 ML 1+8 Mooney Viscosity at 100° C., an ethylene content of 55%, and 3.5% hexadiene, high density polyethylene of 18 MI, and polypropylene of 30 MI, and 25 pounds of a blend of polypropylene, 20% of furnace carbon black with an average particle size of about 19 nm. and a surface area of 140 square meters per gram and 0.8% dimethyl succinate polymer with 4-hydroxy-2,2,6,6,-tetra-methyl-1-piperidine ethanol, and 0.24% of tetrakis[methylene(3,5-di-tert-butyl-4-hydroxyhydrocinnamate)]methane, and tris(2,4-di-tert-butylphenyl)phosphite were fed to a commercial cast extruder and converted into 1 mil cast film.

The film will degrade within a period of about 50 to 110 days in a field in New Jersey.

EXAMPLE 18

About 835 pounds of polypropylene resin with a melt flow index of 12, 100 pounds of a 37.5/12.5/25.65/24.35 blend of ethylene/propylene/1,4-hexadiene terpolymer having a 31 ML 1+8 Mooney Viscosity at 100° C., 5.5% hexadiene, and an ethylene content of 53%, ethylene/propylene/1,4-hexadiene terpolymer having a 57 ML 1+8 Mooney Viscosity at 100° C., an ethylene content of 55%, and 3.5% hexadiene, high density polyethylene of 18 MI, and polypropylene of 30 MI and 65 pounds of a blend of polypropylene, 20% of furnace carbon black with an average particle size of about 75 nm. and a surface area of 25 square meters per gram and 4.3% dimethyl succinate polymer with 4-hydroxy-2,2,6,6,-tetra-methyl-1-piperidine ethanol, and 0.4% of tetrakis[methylene(3,5-di-tert-butyl-4-hydroxyhydrocinnamate)]methane, and tris(2,4-di-tert-butylphenyl)phosphite were fed to a commercial cast extruder and converted into 1.2 mil cast film.

The film will degrade within a period of about 80 to 180 days in a field in Florida.

EXAMPLE 19

About 780 pounds of polypropylene resin with a melt flow index of 12, 100 pounds of a 37.5/12.5/25.35/24.35/0.3 blend of ethylene/propylene/1,4-hexadiene terpolymer having a 31 ML 1+8 Mooney Viscosity at 100° C., 5.5% hexadiene, and an ethylene content of 53%, ethylene/propylene/1,4-hexadiene terpolymer having a 57 ML 1+8 Mooney Viscosity at 100° C., an ethylene content of 55%, and 3.5% hexadiene, high density polyethylene of 18 MI, polypropylene of 30 MI, and tetrakis[methylene(3,5-di-tert-butyl-4-hydroxyhydrocinnamate)]methane, and tris(2,4-di-tert-butylphenyl)phosphite and 120 pounds of a blend of polypropylene, 20% of furnace carbon black with an average particle size of about 75 nm. and a surface area of 25 square meters per gram and 1.25% dimethyl succinate polymer with 4-hydroxy-2,2,6,6,-tetramethyl-1-piperidine ethanol, and 0.4% of tetrakis[methylene(3,5-di-tert-butyl-4-hydroxyhydrocinnamate)]methane, and tris(2,4-di-tert-butyl-phenyl)phosphite were fed to a commercial cast extruder and converted into 1 mil cast film.

The film will degrade within a period of 80 to 180 days in a field in South Carolina.

EXAMPLE 20

About 850 pounds of polypropylene resin with a melt flow index of 12, 105 pounds of a 37.5/12.5/25.35/24.35/0.3 blend of ethylene/propylene/1,4 -hexadiene terpolymer having a 31 ML 1+8 Mooney Viscosity at 100° C., 5.5% hexadiene, and an ethylene content of 53%, ethylene/propylene/1,4-hexadiene terpolymer having a 57 ML 1+8 Mooney Viscosity at 100° C., an ethylene content of 55%, and 3.5% hexadiene, high density polyethylene of 18 MI, polypropylene of 30 MI, and tetrakis[methylene(3,5-ditert-butyl-4-hydroxyhydrocinnamate)]methane, and tris(2,4-di-tert-butylphenyl)phosphite and 45 pounds of a blend of polypropylene, 20% of furnace carbon black with an average particle size of about 75 nm. and a surface area of 25 square meters per gram and 6.2% dimethyl succinate polymer with 4-hydroxy-2,2,6,6,-tetramethyl-1-piperidine ethanol, and 0.4% of tetrakis [methylene (3,5-di-tert-butyl-4-hydroxyhydrocinnamate) ]methane, and tris (2,4-di-tert-butylphenyl) phosphite were fed to a commercial cast extruder and converted into 1.25 mil cast film.

The film will degrade within a period of 50 to 110 days in a field in New Jersey.

EXAMPLE 21

About 650 pounds of polypropylene resin with a melt flow index of 12, 300 pounds of a 67/25/8/0.3 blend of ethylene/propylene/1,4-hexadiene terpolymer having a 31 ML 1+8 Mooney Viscosity at 100° C. 5 5% hexadiene, and an ethylene content of 53%, high density polyethylene of 18 MI, polypropylene of 30 MI, and tetrakis[methylene(3,5-di-tert-butyl-4-hydroxyhydrocinnamate)]methane, and tris(2,4-di-tert-butylphenyl)phosphite and 50 pounds of a blend of polypropylene, 20% of furnace carbon black with an average particle size of about 85 nm. and a surface area of less than 30 square meters per gram and 1% dimethyl succinate polymer with 4-hydroxy-2,2,6,6,-tetramethyl-1-piperidine ethanol, and 0.4% of tetrakis[methylene(3,5-di-tert-butyl-4-hydroxyhydrocinnamate)]methane, and tris(2,4-di-tert-butylphenyl)phosphite were fed to a commercial cast extruder and converted into 1.25 mil cast film.

The film will degrade within a period of 50 to 110 days in a field in New Jersey.

EXAMPLE 22

About 500 pounds of polypropylene resin with a melt flow index of 12,450 pounds of a 67/30/7.7/0.3 blend of ethylene/propylene/1,4-hexadiene terpolymer having a 31 ML 1+8 Mooney Viscosity at 100° C., 5.5% hexadiene, and an ethylene content of 53%, high density polyethylene of 18 MI, polypropylene of 30 MI, and tetrakis[methylene(3,5-di-tert-butyl-4-hydroxyhydrocinnamate)]methane, and tris(2,4-di-tert-butylphenyl)phosphite and 50 pounds of a blend of polypropylene, 20% of furnace carbon black with an average particle size of about 75 nm. and a surface area of 25 square meters per gram and 1% dimethyl succinate polymer with 4-hydroxy-2,2,6,6,-tetramethyl-1-piperidine ethanol, and 0.4% of tetrakis[methylene(3,5-di-tert-butyl-4-hydroxyhydrocinnamate)]methane, and tris(2,4-di-tert-butylphenyl)phosphite were fed to a commercial cast extruder and converted into 1.25 mil cast film.

The film will degrade within a period of 50 to 110 days in a field in New Jersey.

EXAMPLE 23

About 880 pounds of polypropylene resin with a melt flow index of 12, 60 pounds of a 37.5/12.5/25/24/1 blend of ethylene/propylene/1,4-hexadiene terpolymer having a 31 ML 1+8 Mooney Viscosity at 100° C. 5 5% hexadiene, and an ethylene content of 53%, ethylene/propylene/1,4-hexadiene terpolymer having a 57 ML 1+8 Mooney Viscosity at 100° C., an ethylene content of 55%, and 3.5% hexadiene, high density polyethylene of 18 MI, polypropylene of 30 MI, and tetrakis[methylene(3,5-di-tert-butyl-4-hydroxyhydrocinnamate)]methane, and tris(2,4-di-tert-butylphenyl)phosphite and 60 pounds of a blend of polypropylene, 20% of furnace carbon black with an average particle size of about 19 nm. and a surface area of 140 square meters per gram and 2% dimethyl succinate polymer with 4-hydroxy-2,2,6,6,-tetramethyl-1-piperidine ethanol, and 4% of tetrakis[methylene(3,5-di-tert-butyl-4-hydroxyhydrocinnamate)]methane, and tris(2,4-di-tert-butylphenyl)phosphite were fed to a commercial cast extruder and converted into 1 mil cast film.

The film will degrade within a period of 80 to 180 days in a field in South Carolina.

EXAMPLE 24

About 840 pounds of polypropylene resin with a melt flow index of 30, 100 pounds of a 37.5/12.5/25.35/24.35/0.3 blend of ethylene/propylene/1,4-hexadiene terpolymer having a 31 ML 1+8 Mooney Viscosity at 100° C., 5.5% hexadiene, and an ethylene content of 53%, ethylene/propylene/1,4-hexadiene terpolymer having a 57 ML 1+8 Mooney Viscosity at 100° C., an ethylene content of 55% and 3 5% hexadiene, high density polyethylene of 18 MI, polypropylene of 30 MI, and tetrakis[methylene(3,5-di-tert-butyl-4-hydroxyhydrocinnamate)]methane, and tris(2,4-di-tert-butylphenyl)phosphite and 60 pounds of a blend of polypropylene, 20% of furnace carbon black with an average particle size of about 75 nm. and a surface area of 25 square meters per gram and 1% dimethyl succinate polymer with 4-hydroxy-2,2,6,6,-tetramethyl-1-piperidine ethanol, and 0.4% of tetrakis[methylene(3,5-di-tert-butyl-4-hydroxyhydrocinnamate)] methane, and tris(2,4-di-tert-butylphenyl)phosphite were fed to a commercial cast extruder and converted into 1.1 mil cast film.

The film will degrade within a period of 50 to 110 days in a field in South Carolina.

EXAMPLE 25

About 860 pounds of polypropylene resin with a melt flow index of 12, 60 pounds of a 67/30/8/0.3 blend of ethylene/propylene/1,4-hexadiene terpolymer having a 31 ML 1+8 Mooney Viscosity at 100° C., 5.5% hexadiene, and an ethylene content of 53%, high density polyethylene of 18 MI, polypropylene of 30 MI, and tetrakis[methylene(3,50di-tert-butyl-4-hydroxyhydrocinnamate)]methane, and tris(2,4-di-tert-butylphenyl)phosphite and 80 pounds of a blend of polypropylene, 20% of furnace carbon black with an average particle size of about 120 nm. and a surface area of less than 30 square meters per gram and 0.8% dimethyl succinate polymer with 4-hydroxy-2,2,6,6,-tetramethyl-1-piperidine ethanol, and 0.8% of tetrakis[methylene(3,5-di-tert-butyl-4-hydroxyhydrocinnamate)]methane, and tris(2,4-di-tert-butylphenyl)phosphite were fed to a commercial cast extruder and converted into 1.25 mil cast film.

The film will degrade within a period of 50 to 110 days in a field in New Jersey.

EXAMPLE 26

About 780 pounds of polypropylene resin with a melt flow index of 12, 190 pounds of a 37.5/12.5/25/24/1 blend of ethylene/propylene/1,4-hexadiene terpolymer having a 31 ML 1+8 Mooney Viscosity at 100° C. 5 5% hexadiene, and an ethylene content of 53%, ethylene/propylene/1,4-hexadiene terpolymer having a 57 ML 1+8 Mooney Viscosity at 100° C., an ethylene content of 55%, and 3.5% hexadiene, high density polyethylene of 18 MI, polypropylene of 30 MI, and tetrakis[methylene(3,5-di-tert-butyl-4-hydroxyhydrocinnamate)]methane, and tris(2,4-di-tert-butylphenyl)phosphite and 120 pounds of a blend of 78.35% polypropylene, 20% of furnace carbon black with an average particle size of about 75 nm. and a surface area of 25 square meters per gram and 1.25% dimethyl succinate polymer with 4-hydroxy-2,2,6,6,-tetramethyl-1-piperidine ethanol, and 4% of tetrakis[methylene(3,5-di-tert-butyl-4-hydroxyhydrocinnamate)]methane, and tris(2,4-di-tert-butylphenyl)phosphite were fed to a commercial cast extruder and converted into 1 mil cast film.

The film will degrade within a period of 80 to 180 days in a field in South Carolina.

EXAMPLE 27

About 780 pounds of polypropylene resin with a melt flow index of 12, 190 pounds of a 37.5/12.5/25.25/24.25/0.5 blend of ethylene/propylene/1,4-hexadiene terpolymer having a 31 ML 1+8 Mooney Viscosity at 100° C., 5.5% hexadiene, and an ethylene content of 53%, ethylene/propylene/1,4-hexadiene terpolymer having a 57 ML 1+8 Mooney Viscosity at 100° C., an ethylene content of 55%, and 3.5% hexadiene, high density polyethylene of 18 MI, polypropylene of 30 MI, and tetrakis[methylene(3,5-di-tert-butyl-4-hydroxyhydrocinnamate)]methane, and tris(2,4-di-tert-butylphenyl)phosphite and 30 pounds of a blend of polypropylene, 20% of furnace carbon black with an average particle size of about 19 nm. and a surface area of 140 square meters per gram and 5% dimethyl succinate polymer with 4-hydroxy-2,2,6,6,-tetramethyl-1-piperidine ethanol, and 0.5% of tetrakis[methylene(3,5-di-tert-butyl-4-hydroxyhydrocinnamate)]methane, and tris(2,4-di-tert-butylphenyl)phosphite were fed to a commercial cast extruder and can be converted into 1 mil cast film.

The film will degrade within a period of 50 to 110 days in a field for growing transplanted watermelons in North Carolina.

EXAMPLE 28

About 775 pounds of polypropylene resin with a melt flow index of 12, 160 pounds of a 37.5/12.5/25.25/24.25/0.5 blend of ethylene/propylene/1,4-hexadiene terpolymer having a 31 ML 1+8 Mooney Viscosity at 100° C., 5.5% hexadiene, and an ethylene content of 53%, ethylene/propylene/1,4-hexadiene terpolymer having a 57 ML 1+8 Mooney Viscosity at 100° C., an ethylene content of 55%, and 3.5% hexadiene, high density polyethylene of 18 MI, polypropylene of 30 MI, and tetrakis[methylene(3,5-di-tert-butyl-4-hydroxyhydrocinnamate)]methane, and tris(2,4-di-tert-butylphenyl)phosphite and 65 pounds of a blend of polypropylene, 20% of furnace carbon black with an average particle size of about 19 nm. and a surface area of 140 square meters per gram and 0.31% dimethyl succinate polymer with 4-hydroxy-2,2,6,6,-tetramethyl-1-piperidine ethanol, and 0.5% of tetrakis[methylene(3,5-di-tert-butyl-4-hydroxyhydrocinnamate)]methane, and tris(2,4-di-tert-butylphenyl)phosphite can be fed to a commercial cast extruder and can be converted into 1 mil cast film.

The film will degrade within a period of 50 to 110 days in a field for growing transplanted watermelons in North Carolina.

EXAMPLE 29

About 760 pounds of polypropylene resin with a melt flow index of 12, 160 pounds of a 37.5/12.5/25.25/24.25/0.5 blend of ethylene/propylene/1,4-hexadiene terpolymer having a 31 ML 1+8 Mooney Viscosity at 100° C., 5.5% hexadiene, and an ethylene content of 53%, ethylene/propylene/1,4-hexadiene terpolymer having a 57 ML 1+8 Mooney Viscosity at 100° C., an ethylene content of 55%, and 3.5% hexadiene, high density polyethylene of 18 MI, polypropylene of 30 MI, and tetrakis[methylene(3,5-di-tert-butyl-4-hydroxyhydrocinnamate)]methane, and tris(2,4-di-tert-butylphenyl)phosphite and 80 pounds of a blend of polypropylene, 20% of furnace carbon black with an average particle size of about 19 nm. and a surface area of 140 square meters per gram and 1% dimethyl succinate polymer with 4-hydroxy-2,2,6,6,-tetramethyl-1-piperidine ethanol, and 0.5% of tetrakis[methylene(3,5-di-tert-butyl-4-hydroxyhydrocinnamate)]methane and tris(2,4-di-tert-butylphenyl)phosphite can be fed to a commercial cast extruder and can be converted into 1 mil cast film.

The film will degrade within a period of 80 to 180 days in a field for growing peppers in Hawaii.

What is claimed is:

1. Process of controlling the photodegradation by sunlight of a film of polypropylene, or propylene copolymers, said film having a thickness of about 1.25 mils or less by forming a composition comprising carbon black as the sole UV light absorbing stabilizer, said carbon black comprising about 0.5% to about 2.4% by weight of said film and said carbon black having a particle size of about 15 nm to about 120 nm; hindered amine light stabilizer for interrupting the free radical chain degradation mechanism, said hindered amine light stabilizer comprising about 0.02% to about 0.4% by weight of said film; an impact modifier for enhancing the photodegradability of said film, said impact modifier comprising about 1% to about 40% by weight of said film; and forming a film from said composition.

2. Process according to claim 1 wherein said carbon black comprises about 0.9% to about 2.4% by weight of said film, wherein said carbon black has a particle size of about 50 nm to about 120 nm, and wherein said hindered amine light stabilizer comprises about 0.03% to about 0.2% by weight of said film.

3. Process according to claim 1 wherein said carbon black comprises about 0.5% to about 1.6% by weight of said film, wherein said carbon black has a particle size of about 15 nm to about 40 nm, and wherein said hindered amine light stabilizer comprises about 0.08% to about 0.25% by weight of said film.

4. Process according to claim 1 wherein said carbon black comprises about 1.3% to about 2.4% by weight of said film, wherein said carbon black has a particle size of about 50 nm to about 120 nm, and wherein said hindered amine light stabilizer comprises about 0.15% to about 0.28% by weight of said film.

5. Process according to claim 1 wherein said carbon black comprises about 0.6% to about 1.3% by weight of said film, wherein said carbon black has a particle size of about 15 nm to about 40 nm, and wherein said hindered amine light stabilizer comprises about 0.02% to about 0.15% by weight of said film.

6. Process according to claim 1 wherein said modifier comprises about 3% to about 30% by weight of said film.

7. Process according to claim 1 wherein said modifier comprises about 5% to about 25% by weight of said film.

8. Process according to claim 1 wherein said modifier is selected from a group consisting of a terpolymer of ethylene, propylene, and a diene selected from a group consisting of hexadiene, dicyclopentadiene, and ethylidene norbornylene; copolymers of ethylene and propylene; copolymers of butene-1 and ethylene; copolymers of propylene and butene-1; copolymers of ethylene and vinyl acetate; and copolymers of butadiene and styrene.

9. Process according to claim 1 wherein said impact modifier is selected from a group consisting of a terpolymer of ethylene, propylene, and a diene selected from a group consisting of hexadiene, dicyclopentadiene, and ethylidene norbornylene; copolymers of ethylene and propylene; and copolymers of butene-1 and ethylene.

10. Process according to claim 1 wherein said impact modifier is selected from a group consisting of copolymers of ethylene and propylene; copolymers of butene-1 and ethylene; and copolymers of propylene and butene-1.

11. Process according to claim 1 wherein said impact modifier comprises copolymers of butene-1 and ethylene.

12. Process according to claim 1 wherein said impact modifier comprises a terpolymer of ethylene, propylene, and a diene selected from a group consisting of hexadiene, dicyclopentadiene, and ethylidene norbornylene.

13. Process according to claim 1 wherein said impact modifier comprises a terpolymer of ethylene, propylene, and hexadiene.

14. Process according to claim 1 wherein said impact modifier comprises a blend of a copolymer of butene-1 and ethylene and a terpolymer of ethylene, propylene, and a diene selected from a group consisting of hexadiene, ethylidene norbornylene, and dicyclopentadiene, 15. Process according to claim 1 wherein said impact modifier comprises a blend of a copolymer of butene-1 and ethylene and a terpolymer of ethylene, propylene, and hexadiene.

16. Process according to claim 11 wherein said butene-1 is about 85% by weight of said copolymer.

17. Process according to claim 1 wherein said hindered amine light stabilizer is selected from a group consisting of bis (2,2,6,6-tetramethyl-4-piperridinyl) sebacate; bis(1,2,2,6,6,-pentamethyl-4-piperridinyl) sebacate; n-butyl-(3,5-di-tert-butyl-4-hydroxybenzyl) bis-(1,2,2,6,6-pentamethyl-4-piperridinyl)malonate; N-N'-bis(2,2,6,6,-tetramethyl-4-piperidinyl)-1,6-hexanediamine, polymer with 2,4,6-trichloro-1,3,5-triazine and 2,4,4-trimethyl-1,2-pentanamine; dimethyl succinate polymer with 4-hydroxy-2,2,6,6,tetramethyl-1-piperidine ethanol; hexane-1,6-diamine; N,N'-bis(-2,2,6,6-tetramethyl-4-piperidinyl)-, polymer with 2,4-dichloro-6-)4-morpholinyl)-1,3,5-triazine; a high molecular weight tri-functional hindered amine light stabilizer based on tetramethylpiperazinone; and a hindered amine light stabilizer with a silicon backbone and tetramethylpiperidine as a side chain.

18. Process according to claim 1 wherein said film is formed from said composition by being extruded in a cast film extruder.

* * * * *